United States Patent [19]
Ekberg

[11] 4,292,742
[45] Oct. 6, 1981

[54] PLANT FOR DRYING FUEL
[75] Inventor: Håkan Ekberg, Norrköping, Sweden
[73] Assignee: STAL-LAVAL Turbin AB, Sweden
[21] Appl. No.: 45,708
[22] Filed: Jun. 5, 1979
[30] Foreign Application Priority Data
Jun. 21, 1978 [SE] Sweden .............................. 7807117
[51] Int. Cl.³ .............................................. F26B 3/08
[52] U.S. Cl. .......................................... 34/35; 34/86; 34/57 A; 110/224; 432/58
[58] Field of Search ................ 34/10, 57 R, 57 A, 77, 34/35, 86; 432/58, 72; 110/218, 219, 224, 229

[56] References Cited
U.S. PATENT DOCUMENTS

| | | | |
|---|---|---|---|
| 3,192,068 | 6/1965 | Brandt | 34/57 R |
| 3,702,596 | 11/1972 | Winther | 110/224 |
| 3,793,743 | 2/1974 | Kemmetmueller | 34/57 A |
| 3,815,522 | 6/1974 | Larger | 110/224 |
| 3,858,535 | 1/1975 | Shiba | 110/224 |
| 4,101,264 | 7/1978 | Barr | 34/10 |
| 4,145,818 | 3/1979 | Kulling | 34/57 A |

Primary Examiner—Larry I. Schwartz
Attorney, Agent, or Firm—Pollock, Vande Sande & Priddy

[57] ABSTRACT

Fuel and additional material are dried prior to entering the combustion chamber of a thermal power plant using drying chambers having fluidized beds. The heat required for drying is extracted from the hot ashes from the power plant by means of an oxygen-poor gas which circulates through heating chambers containing the ashes and drying chambers containing the fuel in a substantially closed loop. The loop may include a condenser for dehumidification of the circulating gas.

10 Claims, 2 Drawing Figures

PLANT FOR DRYING FUEL

BACKGROUND OF THE INVENTION

The present invention relates to a plant for drying fuel or material added to fuel, of the type to fire a thermal power plant. To dry a solid fuel, heat is applied by a circulating hot gas. Where a readily inflammable fuel, such as brown coal, is to be dried, the circulating hot gas should be poor in oxygen to avoid early ignition of the fuel.

SUMMARY OF THE INVENTION

According to the invention, the hot ashes from the power plant are used as heat source through which an oxygen-poor gas is circulated in a substantially closed circuit or loop. The heated gas is then used to dry the fuel or other material. According to a further development of the invention, the heating of the gas and drying of the fuel are suitably carried out in fluidized beds. The same process also is suited for drying material other than fuel.

BRIEF DESCRIPTION OF THE DRAWING

In other respects the invention will be described in more detail with reference to the accompanying drawing, in which.

DETAILED DESCRIPTION OF THE PREFERRED EMBODIMENT

Figure 1:
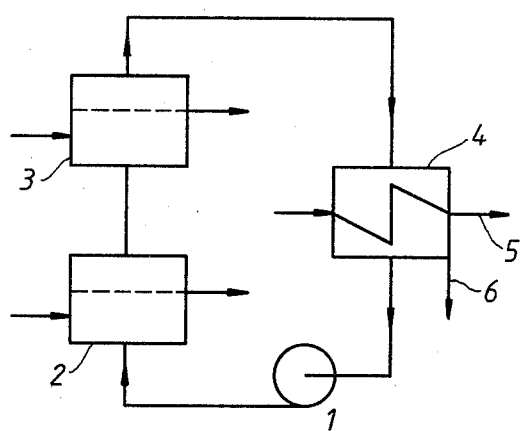
FIG. 1 shows an outline diagram of a plant according to the invention.

FIG. 1 shows a closed circuit which comprises a fan 1 for circulating the gas, a heating chamber 2 for receiving the hot ashes from the combustion chamber of the power plant, a chamber 3 for drying the fuel, and a condenser 4 having a cooling coil 5 for condensing of any moisture in the circulating gas.

The condensate is discharged through an outlet 6. To achieve a good heat exchange in the heating chamber 2 and the drying chamber 3, they are suitably formed as fluidized beds, and the ashes, fuel or other material may, as indicated, be supplied to one side of the bed and be discharged from the other side by means of a spillway. As circulating gas, for example, nitorgen or some other relatively inert gas may be used. Possibly, the flue gases of the power plant may be used, since they already have a reduced oxygen content and rapidly become rather oxygen-poor as the gas is recirculated. Thus, the invention results in the heat in the ashes being utilized, and by recirculation of the drying gas the oxygen content therein may easily be kept low.

Figure 2:
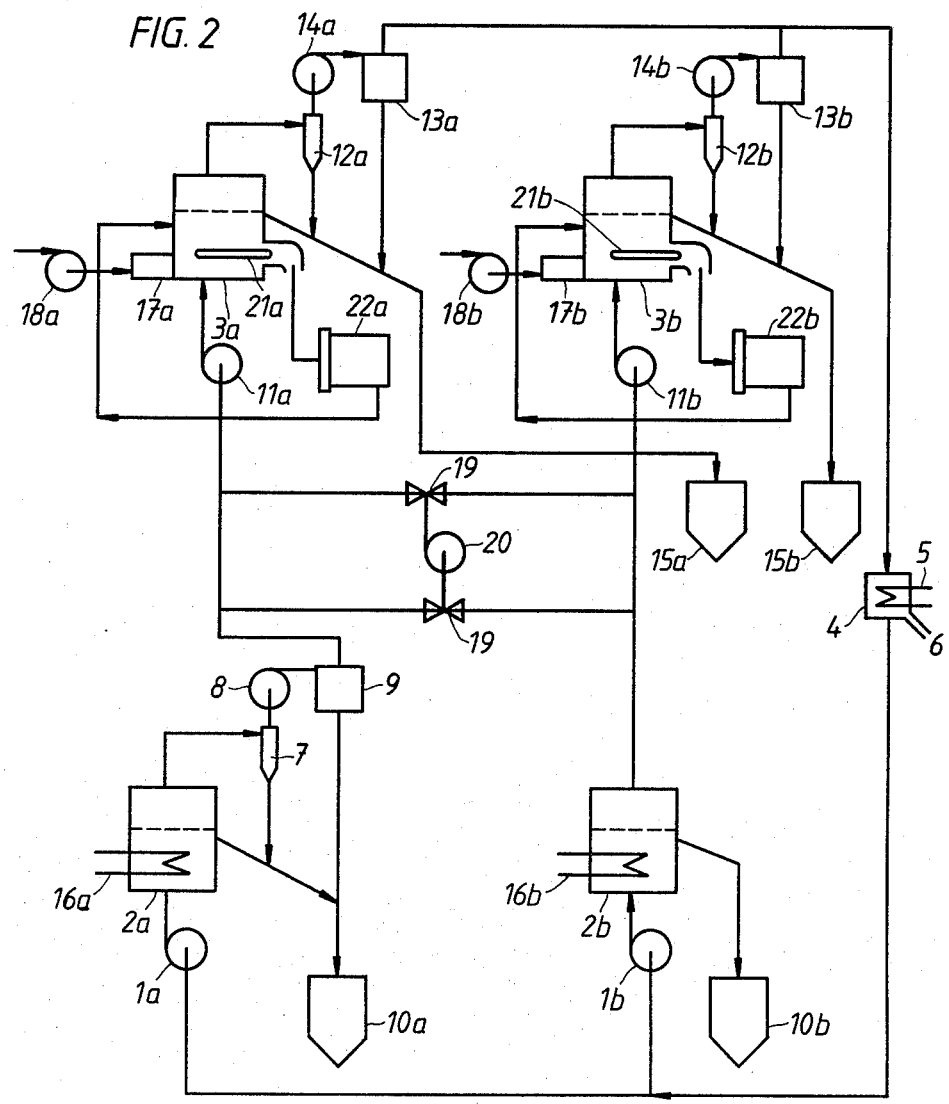
FIG. 2 shows in more detail how such a plant can be constructed.

If the combustion chamber of the power plant is constructed with a fluidized bed, additional materials for this are usually required for the bed such as limestone in the form of dolomite or the like. These bed materials may also require drying, and therefore the drying plant according to the invention is suitably constructed with two parallel loops, as shown in FIG. 2. In FIG. 2, components 1, 2, 3 according to FIG. 1 have been marked with letters a and b for the two parallel loops. As is clear, the condenser 4 may be common to both loops.

Heating chambers 2a and 2b suitably receive different forms of ashes from the combustion chamber of the power plant. For example, chamber 2a may be supplied with the fly ash which has been separated from the exhaust gases of the combustion chamber by means of cyclones or filters. This ash typically contains finer particles which will be entrained by the circulating gas; thus, the discharge from chamber 2a should be provided with a cyclone separator 7 and a filter 9 for cleaning the hot gas before it is forwarded to drying chamber 3a. An additional fan 8 may be connected between cyclone 7 and filter 9. Discharges from cyclone 7 and filter 9 as well as a spillway for cooled ashes from chamber 2a are led to a reservoir 10a, from where the ashes are finally removed.

Heating chamber 2b suitably receives ashes from a spillway in the combustion chamber of the power plant. These ashes typically are so coarse-grained that there is no need of any cyclone separator or filter on the outlet from chamber 2b. The cooled ashes from here are passed from a spillway to a reservoir 10b.

To ensure that the gases from chambers 2a and 2b have the necessary velocity, they may be blown into drying chambers 3a and b by means of additional fans 11a and b. In view of the great variation of the grain size of the fuel in the chamber 3a as well as of the additional material in 3b, these chambers and also chamber 2a should be provided with a cyclone separator 12 and a filter 13 on the outlet side and possibly an extra fan 14 between the cyclone and the filter. As in the case of chamber 2a, the discharges from the filters and cyclone separators are brought together with the spillway from the fluidized bed to the corresponding reservoirs 15a and b for fuel and additional materal. It is not of fundamental significance which of the heating chambers 2a and b is connected to the drying chamber for fuel and additional material 3a and b.

Depending on the heat balance in the whole power plant, the ashes may contain too little or too much heat for drying fuel and additional material. To be able to remove surplus heat, chambers 2a and b can therefore be provided with cooling coils 16. Similarly, a heat deficit may be remedied by means of supplemental combustion chambers 17a and b on drying chambers 3a and b. These combustion chambers are provided with fans 18a and b for blowing hot combustion gases into chambers 3a and b. Furthermore, the two loops may possibly be balanced mutually by means of cross connections with stop valves 19 and possibly an additional fan 20.

To obtain the proper maximum grain size of fuel and additional material, a power plant of this kind is normally equipped with mills for crushing coarse material. In a plant according to the invention these mills are suitably combined with the drying chambers. The fluidized beds act as sorters since the coarser material sinks to the bottom of the bed and the finer material is carried away through the spillway or accompanies the gas and is separated in the cyclone and the filter. Conveyor belts 21a and b are arranged at the bottom of chambers 3a and b, by means of which coarser material is supplied to crushing mills 22a and b, possibly by sluicing. From these mills the material is brought back to the fluidized beds.

I claim:

1. A method for drying solid materials such as fuel and fuel additives used in thermal power plants, comprising the steps of:

circulating a gas having a low oxygen content around a substantially closed loop;

passing said gas in said loop through hot ashes from said power plant, to heat said gas;

passing said gas in said loop through said materials to be dried; and removing moisture from said gas in said loop prior to passing said gas through said hot ashes.

2. The method according to claim 1, further comprising the steps of adding heat to said gas as it passes through said materials to be dried.

3. The method according to claim 11, further comprising the steps of delivering said hot ashes and said materials to separate fluidized beds through which said gas flows in said loop.

4. A method according to claim 1, wherein said power plant comprises a fluidized bed in which solid fuel is burned in a bed of material and said materials to be dried are the materials of said bed, further comprising the steps of circulating said gas around a further substantially closed loop; passing said gas in said further loop through hot ashes from said power plant to heat said gas; and passing said gas in said further loop through said solid fuel to be dried prior to introduction into said fluidized bed.

5. The method according to claim 4, wherein said moisture removing step is performed on gas from both said loops.

6. Apparatus for drying solid materials such as fuel and fuel additives used in a thermal power plant of the type which produce hot ashes, comprising:

a substantially closed loop for circulation of a gas;

means for circulating a gas having a low oxygen content around said loop;

at least one first chamber means connected in said loop for receiving both said gas and said hot ashes and producing heated gas therefrom;

at least one second chamber means connected in said loop downstream of said first chamber for receiving both said heated gas and solid materials to be dried; and means connected in said loop downstream of said second chamber and upstream of said first chamber for condensing moisture from said gas and removing condensate from said loop.

7. Apparatus according to claim 6, wherein said first and second chamber means comprise fluidized beds.

8. Apparatus according to claim 7, wherein said power plant comprises a fluidized bed in which a solid fuel is burned in a bed of material and said second chamber means receives said material for drying, also comprising a further substantially closed loop for circulation of said gas; means for circulating said gas around said further loop; at least one third chamber means connected in said further loop for receiving both said gas and said hot ashes from said power plant; and at least one fourth chamber means connected downstream of said third chamber in said further loop for receiving both said gas and said solid fuel for drying prior to introduction into said fluidized bed.

9. Apparatus according to claim 8, wherein said condensing means receives gas from both of said second and fourth chambers.

10. Apparatus according to claim 6, further comprising means for adding supplemental heat to said second chamber means.

* * * * *